Patented Aug. 2, 1938

2,125,851

UNITED STATES PATENT OFFICE 2,125,851

EXTREME PRESSURE LUBRICANT

Anderson W. Ralston, Chicago, Ill., assignor to Armour and Company, Chicago, Ill., a corporation of Illinois No Drawing. Application October 12, 1936, Serial No. 105,351

7 Claims. (Cl. 87—9)

This invention relates to extreme pressure lubricants and it comprises as such lubricants polymerized nitriles, in other words aliphatic nitriles which have been polymerized to complex liquid polymers, and it further comprises extreme pressure lubricants composed of mixtures of such polymerized nitriles with mineral lubricant materials.

In present day lubricating practice much attention has been paid to choosing the proper lubricant for the specific conditions of use. In some instances lubricating oils of low viscosity are preferred to lubricating oils of higher viscosity. Efforts have been made to select scientifically that lubricant which is best suited for the lubrication of some specific part of a machine. Within recent years it has been recognized that those parts of a rotating machine which operate under high pressures or temperatures should be lubricated by lubricants which have been especially prepared for these conditions. Such lubricants are commonly referred to in the art as extreme pressure lubricants and they should have characteristics not ordinarily found in mineral oils or petroleum greases. When bearings operate under very high pressures appreciable heats of friction develop. Frequently the high temperatures met with are sufficient to actually weld the bearing parts together and this results in bearing failure. The "welding action" does not mean that the entire surface of the rotating parts are welded together. If the heat is high enough to weld small areas or points on the contacting bearing surfaces, continued rotation of the bearing under such conditions of improper lubrication results in portions of the bearing material being torn off. Ultimately, if the condition is allowed to continue, the bearing will fail completely.

Ordinary petroleum lubricants will reduce friction but they will not overcome the tendency for welding action at high bearing pressures or temperatures. Consequently, much research has been directed toward the discovery of substances which could be added to lubricating oils to prevent bearing seizure under high temperatures and pressures. These added materials must have physical and chemical properties which fit them for use under the specific lubrication conditions stated. Obviously they must be heat stable, possess low internal friction, and be non-corrosive toward metals. At the present time sulfided fats or fatty acids are added to lubricating mineral oils to impart extreme pressure characteristics to the lubricant. Other addition agents have been suggested from time to time but none of them, so far as I am aware, have wholly satisfied the requirements of the art.

The failure of bearings operating at high pressures is believed to be due largely to the excessive temperatures developed in the lubricating film. Although many lubricants will lubricate for a while under high pressures, the heat developed in the lubricating film results in bearing seizure. Consequently, one advantageous way of determining the effectiveness of any lubricant for use under extreme pressure conditions is to compare the temperature rise in the body of lubricating oil with some standard lubricant operating under similar conditions. Another way of comparing such lubricants is to determine the amount of power required to rotate the moving parts under equivalent conditions of load. What will or will not prove to be a satisfactory extreme pressure lubricant can only be determined by suitable tests. Apparently the physical and chemical composition of the lubricant determines its behavior under extreme pressure conditions, but no one has yet been able to lay down any rule by means of which such lubricants may be selected.

Machines have been devised for testing extreme pressure lubricants. Most of these operate upon the same principle. Two metal blocks are provided with opposing arc-like cavities within which a metal pin rotates. The blocks can be moved toward each other by means of jaws engaging the blocks. The actual amount of force used to press the blocks together can be indicated upon a gauge usually running from zero to 4500 pounds. As the jaws are pressed together a portion of the peripheries of the arc-like cavities in the blocks engage the pin with a force depending upon the force applied to the jaws. The actual area of contact of the pin and the blocks is much less than one square inch so the pressure applied to the jaws, or so-called "jaw load" is much less than the actual pressure per square inch with which the blocks are forced against the pin. One such machine is known as the Faville-Levally and my extreme pressure lubricants have been tested therewith. This machine is also provided with a gauge which indicates the torque, namely the measure of resistance to rotation of the pin between the blocks. By attaching a recording watt meter to the machine I can also measure the amount of power required to rotate the pin. The blocks and rotating pin are immersed in a small container in which the oil to be tested can be placed. A thermometer immersed in the oil is used to record the temperature of the oil over definite time intervals.

The machine is provided with means to tighten up the jaws continuously as the test progresses or the jaw load can be increased intermittently over a period of time. For example, the jaw load can be increased by 100 pounds every five minutes. Temperature and power measurements are taken at the end of each five minute interval.

In a previous application, Serial Number 92,943, filed July 27, 1936, I have described methods of preparing polymerized aliphatic nitriles. I have now discovered that such polymerized products are useful as extreme pressure lubricants. These aliphatic polymers are substances of great chemical stability. They are normally liquid materials and for some unexplained reason function as lubricants under extreme pressure and temperature conditions. Undoubtedly the fact that they will lubricate under such conditions is due to their chemical composition, but just what the chemical composition is cannot be stated with certainty. Possibly they are mixtures of high molecular weight polymers.

All of these polymerized aliphatic nitriles can be made by heating a nitrile having four or more carbon atoms in the presence of a polymerized agent. Among the polymerizing agents which I can use are metal chlorides such as aluminum chloride, zinc chloride and iron chloride, chlorides of phosphorus and sulfur, phosphorous pentasulfide, elemental phosphorus, sulfur, and others. When using aluminum chloride as the polymerizing agent it is best to hydrolyze the reaction product in order to free it of aluminum. When other polymerized agents are used they can be filtered from the reaction product.

As stated, these polymerized aliphatic nitriles are good extreme pressure lubricants when used by themselves. They can, however, be added to ordinary mineral lubricants and greases to impart extreme pressure lubricating characteristics to such mineral lubricants.

I shall now give various examples of practicing my invention.

A mixture of stearonitrile is first polymerized by heating the nitrile in contact with 20 percent by weight, based on the amount of stearonitrile, of phosphorous pentasulfide. The heating temperature is about 100° to 175° C. and the time is about 15 hours. The polymerized product, after filtering off any insoluble materials therein, is a fluid oil not unlike a good grade of petroleum oil.

A similar product can be prepared from heating mixtures of stearonitrile and palmitonitrile with the polymerizing agent or by heating a mixture of cracked nitriles obtained by cracking cotton seed fatty acid nitriles in ways hitherto described and claimed by me in issued patents. Such cracked nitrile mixtures can contain low boiling nitriles ranging from butyro through capri. Any straight chain aliphatic nitrile having at least four, and more usually six carbon atoms or more can be polymerized with phosphorous pentasulfide in the manner described.

I shall now tabulate the results of lubrication tests made by using these polymerized nitriles (from stearonitrile) as lubricants in the Faville-Levally machine described above. In obtaining these data the load on the jaw was increased by 100 pounds every five minutes. The torque, temperature, temperature rise, and power were measured and recorded at the end of each five minute interval.

Table 1

| Time | Load | Torque | Temperature rise, °F. | Power, kw. |
|---|---|---|---|---|
| 5 | 0 | 0 | 0 | -------- |
| 10 | 100 | 0 | 6 | 0.03 |
| 15 | 200 | 0 | 13 | 0.03 |
| 20 | 300 | 0.5 | 20 | 0.04 |
| 25 | 400 | 1.0 | 27 | 0.05 |
| 30 | 500 | 2.0 | 34 | 0.055 |
| 35 | 600 | 2.5 | 42 | 0.06 |
| 40 | 700 | 3.0 | 49 | 0.065 |
| 45 | 800 | 3.5 | 55 | 0.065 |
| 50 | 900 | 4.0 | 60 | 0.065 |
| 55 | 1,000 | 4.5 | 66 | 0.07 |
| 60 | 1,100 | 5.0 | 70 | 0.07 |
| 65 | 1,200 | 5.5 | 75 | 0.08 |
| 70 | 1,300 | 6.0 | 81 | 0.08 |
| 75 | 1,400 | 6.5 | 86 | 0.09 |
| 80 | 1,500 | 6.5 | 91 | 0.10 |

I compare the above values with several lubricants now advocated for extreme pressure lubrication. One such lubricant shows the following characteristics when tested under strictly comparative conditions.

Table 2

| Time | Load | Torque | Temperature rise, °F. | Power, kw. |
|---|---|---|---|---|
| 5 | 0 | 0 | 0 | -------- |
| 10 | 100 | 0 | 9 | 0.04 |
| 15 | 200 | 0.5 | 17 | 0.05 |
| 20 | 300 | 1.0 | 26 | 0.06 |
| 25 | 400 | 2.0 | 35 | 0.07 |
| 30 | 500 | 3.0 | 45 | 0.08 |
| 35 | 600 | 4.5 | 53 | 0.08 |
| 40 | 700 | 5.0 | 59 | 0.09 |
| 45 | 800 | 6.0 | 73 | 0.105 |
| 50 | 900 | 7.5 | 84 | 0.12 |
| 55 | 1,000 | 7.5 | 93 | 0.13 |
| 60 | 1,100 | 7.5 | 102 | 0.14 |
| 65 | 1,200 | 8.0 | 111 | 0.16 |
| 70 | 1,300 | 8.5 | 117 | 0.145 |
| 75 | 1,400 | 9.0 | 122 | 0.15 |
| 80 | 1,500 | 10.0 | 129 | 0.16 |

Still another lubricant, commonly used, shows the following characteristics.

Table 3

| Time | Load | Torque | Temperature rise, °F. | Power, kw. |
|---|---|---|---|---|
| 5 | 0 | 0 | 0 | -------- |
| 10 | 100 | 0 | 8 | 0.035 |
| 15 | 200 | 0 | 16 | 0.045 |
| 20 | 300 | 0.5 | 25 | 0.06 |
| 25 | 400 | 2.5 | 36 | 0.07 |
| 30 | 500 | 4.0 | 48 | 0.08 |
| 35 | 600 | 4.5 | 58 | 0.08 |
| 40 | 700 | 5.0 | 68 | 0.09 |
| 45 | 800 | 6.0 | 77 | 0.10 |
| 50 | 900 | 6.5 | 87 | 0.11 |
| 55 | 1,000 | 7.0 | 97 | 0.12 |
| 60 | 1,100 | 8.0 | 111 | 0.15 |
| 65 | 1,200 | 8.5 | 121 | 0.15 |
| 70 | 1,300 | 9.0 | 131 | 0.16 |
| 75 | 1,400 | 10.0 | 138 | 0.16 |
| 80 | 1,500 | 10.5 | 148 | 0.17 |

When all three lubricants are tested under continuously increasing pressure loads, that is to say, the pressure on the jaws is increased continuously, none of the lubricants show a tendency to fail but the temperature rise in the case of the polymerized nitrile at the conclusion of the test is only 81° F. while that of the lubricant in Table 2 is 128° F. and that of the lubricant in Table 3 is 106° F.

Comparison of Tables 1, 2 and 3 indicates clearly that the polymerized nitriles show a much lower temperature rise and lower torque, and that considerably less power is required to rotate the pin between the blocks.

A mixture of the above polymerized nitriles and Pensylvania Bright Stock, a well known lubricant, in proportions of one part of polymerized nitriles to three parts of lubricating oil shows the following characteristics.

Table 4

| Time | Load | Torque | Temperature rise, °F. | Power, kw. |
|---|---|---|---|---|
| 5 | 0 | 0 | 0 | |
| 10 | 100 | 0 | 9 | 0.03 |
| 15 | 200 | 0 | 15 | 0.035 |
| 20 | 300 | 0.5 | 23 | 0.055 |
| 25 | 400 | 2.0 | 32 | 0.055 |
| 30 | 500 | 2.5 | 39 | 0.06 |
| 35 | 600 | 3.5 | 47 | 0.065 |
| 40 | 700 | 4.5 | 54 | 0.07 |
| 45 | 800 | 5.5 | 61 | 0.075 |
| 50 | 900 | 6.5 | 69 | 0.085 |
| 55 | 1,000 | 7.5 | 78 | 0.10 |
| 60 | 1,100 | 8.0 | 88 | 0.115 |
| 65 | 1,200 | 9.0 | 102 | 0.135 |
| 70 | 1,300 | 9.0 | 110 | 0.145 |
| 75 | 1,400 | 9.5 | 117 | 0.14 |
| 80 | 1,500 | 10.0 | 124 | 0.15 |

The above data indicate that the combined lubricant is somewhat better than either of the lubricants of Table 2 or 3.

None of the polymerized nitriles made in accordance with my process displays any tendency to corrode bearing metal even at relatively high temperatures.

Similar results are obtained when the polymerized nitriles are made by polymerizing aliphatic nitriles in the presence of aluminum chloride, mixtures of aluminum chloride with sulfur, or with any of the above mentioned polymerizing agents. It would serve no useful purpose for me to list tabulated data for each and every polymerized nitrile which can be used in my invention. Some of the polymers are not quite as effective as others, and this seems to depend on the kind of polymerizing agent used. Undoubtedly some of the polymerizing agent may enter into chemical combination with the nitrile. This is especially true in a case of polymerizing agents containing sulfur, phosphorus, or chlorine. Nitriles polymerized with sulfur chloride are not as effective as those polymerized with ordinary sulfur. Those polymerized with phosphorous trichloride are also less effective than those prepared with phosphorous pentasulfide. But all of the polymerized nitriles can be used as lubricants and consequently I have drafted my claims accordingly. Although the polymerized nitriles mentioned are especially useful as extreme pressure lubricants, they can, of course, be used to lubricate under ordinary conditions of pressure and temperature. All of my polymerized nitriles can be incorporated in lubricants such as mineral hydrocarbon oils in varying quantities when extreme pressure properties are to be given the oil. It is better to add 25 percent or more of the polymerized nitriles to the mineral oil lubricant to be improved. But since the polymerized nitriles have lubricant properties generally, I do not wish to be limited to any particular range of proportions.

Any aliphatic nitrile containing more than six carbon atoms, or mixtures of such nitriles, can be polymerized to give polymers useful in my invention. I have used, in addition to polymers of stearo and palmito nitriles, polymers obtained from the nitriles of fish oil fatty acids, lard fatty acids, cottonseed oil fatty acids, and soy bean acids.

Having thus described my invention, what I claim is:

1. A lubricant comprising a mineral oil lubricant and polymerized aliphatic nitriles.

2. A lubricant comprising a mineral oil lubricant and the product of polymerizing an aliphatic nitrile having at least six carbon atoms.

3. A lubricant comprising a mineral oil lubricant and polymerized stearonitrile.

4. A lubricant comprising a mineral oil lubricant and polymers obtained by polymerizing an aliphatic nitrile having at least six carbon atoms in the presence of phosphorous pentasulfide.

5. A lubricant comprising a mineral oil lubricant and polymers obtained by polymerizing stearonitrile in the presence of phosphorous pentasulfide.

6. A lubricant comprising a mineral oil lubricant and polymers obtained by polymerizing an aliphatic nitrile having at least six carbon atoms in the presence of aluminum chloride.

7. A lubricant comprising a mineral oil lubricant and polymers obtained by polymerizing stearonitrile in the presence of aluminum chloride.

ANDERSON W. RALSTON.